United States Patent [19]
Terao et al.

[11] Patent Number: 5,293,567
[45] Date of Patent: Mar. 8, 1994

[54] OPTICAL RECORDING METHOD

[75] Inventors: Motoyasu Terao; Masahiro Ojima, both of Tokyo; Yoshio Taniguchi, Hino; Yasushi Tomioka, Kokubunji; Shuji Imazeki, Kodaira, all of Japan

[73] Assignee: Hitachi, Ltd., Tokyo, Japan

[21] Appl. No.: 950,216

[22] Filed: Sep. 24, 1992

Related U.S. Application Data

[63] Continuation of Ser. No. 566,323, Aug. 13, 1990, abandoned, which is a continuation of Ser. No. 149,477, Jan. 28, 1988, abandoned.

[30] Foreign Application Priority Data

Feb. 4, 1987 [JP] Japan .................................. 62-22309

[51] Int. Cl.$^5$ .............................................. G11B 3/70
[52] U.S. Cl. ..................................... 369/94; 369/280; 369/288
[58] Field of Search ............... 369/280, 282, 284, 283, 369/286, 288, 275.1, 94; 346/74.4, 74.6, 135.1

[56] References Cited

U.S. PATENT DOCUMENTS 4,412,231 10/1983 Namba et al. .................... 346/135.1
4,609,611 9/1986 Sigyo et al. ........................ 369/288

FOREIGN PATENT DOCUMENTS 8700341 1/1987 World Int. Prop. O. .

OTHER PUBLICATIONS

Angewante Chemie Feb. 23, 1984 Joseph Friedrich and Dietrich Haarer.

Primary Examiner—Eugene R. LaRoche
Assistant Examiner—Tan Nguyen
Attorney, Agent, or Firm—Antonelli, Terry, Stout & Kraus

[57] ABSTRACT

In an optical recording method which utilizes hole burning, a plurality of sorts of light absorption centers having different properties are caused to coexist or to exist in the form of layers, thereby to remove the problem that, although the multiplicity of recording is high, the spacial recording density is low, so the overall recording density is low. Accordingly, the present invention can provide an optical recording method of very high recording density.

10 Claims, 1 Drawing Sheet

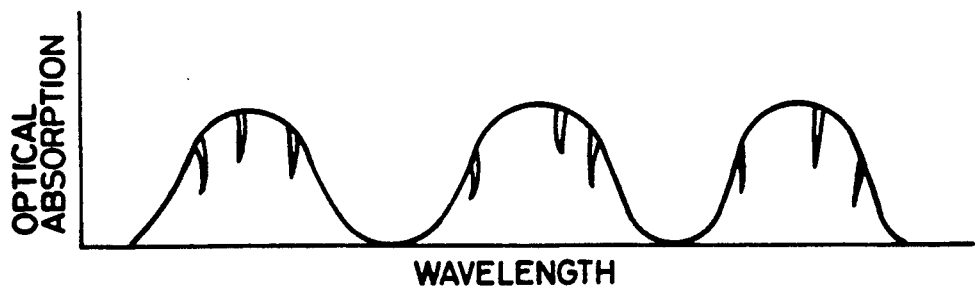
FIG. 1(a)
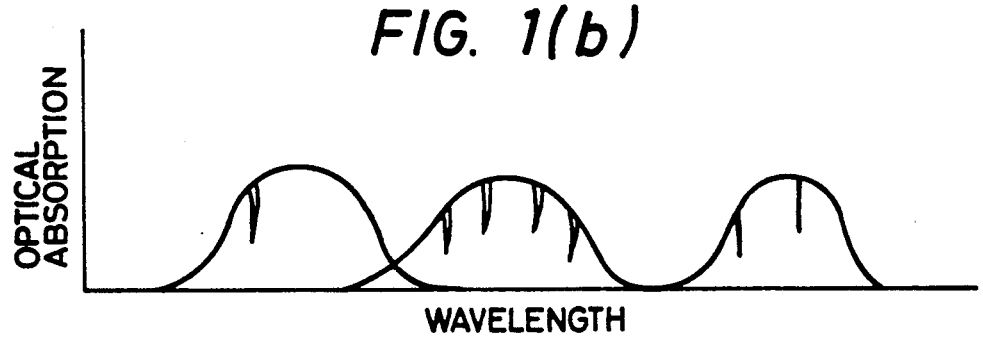
FIG. 1(b)
FIG. 2
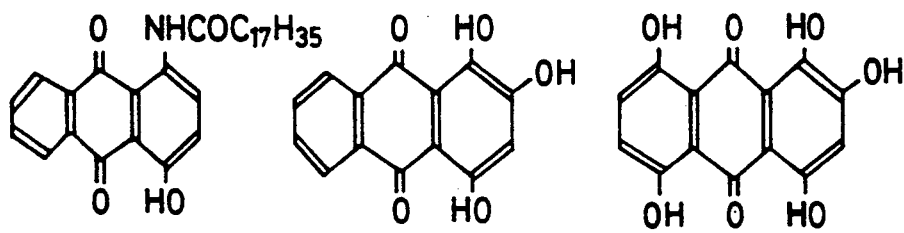
FIG. 3
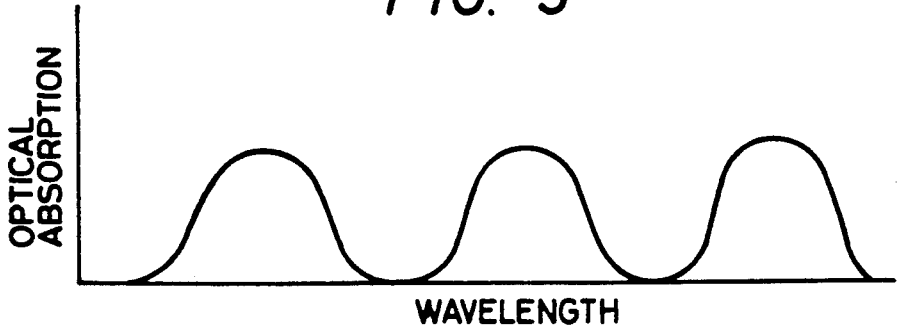

OPTICAL RECORDING METHOD

This is a continuation of application Ser. No. 07/566,323, filed Aug. 13, 1990 abandoned which is a continuation of application Ser. No. 07/149,477, filed Jan. 28, 1988 abandoned.

BACKGROUND OF THE INVENTION

The present invention relates to an information recording method utilizing light, and more particularly to a multiple frequency recording method which utilizes hole burning.

Various researches have hitherto been made on the multiple-frequency optical recording which utilizes the hole burning phenomenon, and they are described in, for example, "Angewandte Chemie" International Edition, English 23, (1984) pp. 113-140. With any of the prior-art methods, the multiplicity in the direction of wavelengths is very high. Since, however, a medium of great light absorption coefficient is not available, the unit recording area of the prior-art method is large, and the overall recording density thereof does not considerably differ from that of a conventional optical recording method.

In the prior art, light absorption centers such as dye molecules or color centers cannot have their density made very high lest the interactions among the centers should intensify to change the property of a light absorption band. In order to attain the practical signal-to-noise ratio of read signals, accordingly, a light projection extent (unit storage region) on a recording medium must be enlarged. Usually, the area of the unit storage region is about 100 times that of an optical disk, so that even if recording at a multiplicity of 1000 is possible, the actual storage capacity per unit area becomes only 10 times.

SUMMARY OF THE INVENTION

An object of the present invention is to provide an optical recording method of high performance which affords a high recording density.

The object is accomplished by causing a plurality of sorts of or various light absorption centers of different properties to coexist or to exist in the form of layers.

There are various measures for causing a plurality of various light absorption centers to coexist or to exist in the form of layers. They are: (1) a measure in which a plurality of various dye molecules having slightly different properties are dispersed together in an organic medium such as methanol-ethanol mixture or an inorganic medium such as $SiO_2$, (2) a measure in which the crystal of an alkaline halide, an oxide or the like is doped with a plurality of ions, (3) a measure in which a parent crystal is heat-treated in the vapor of a halogen or metal differing therefrom, (4) a measure in which a plurality of various crystals are stacked or stuck together, and (5) a measure in which layers with individual dye molecules dispersed therein are stacked.

The alkaline halide crystal which is especially favorable is made up of the combination between at least one element of Sr, Mg, Rb and Cs and at least one element of fluorine, chlorine, bromine and iodine.

The oxide crystal which is especially favorable is made up of oxygen, at least one element of Na, K, Rb, Cs, Fr, Be, Mg, Ca and Ba, and at least one element of other metallic elements.

As the other metallic element stated above, at least one element of Sb, Bi, Si, Ge, Sn, Pb, Al, Ga, In, Tl, Zn, Cd, Cu, Ag, Au, Ni, Co, Fe, Mn, Cr, Mo, W, V, Nb, Ta, Ti, Zr, Hf, Sc, Y and U is favorable, and at least one element of In, Zr, Hf, V, Nb, Ta, Cr, Mo and W is especially favorable. Of course, further elements may well be contained in small amounts. As the ions with which the alkaline halide or oxide crystal is doped, the ions of metallic elements are favorable, and those of at least one element of La, Ce, Pr, Nb, Eu, Cd, Tb, Sc, Ti, V, Mn, Fe, Ni and Cu are especially favorable.

Preferable examples among the various crystals stated above are SrClF doped with metallic ions (e.g., $Sm^{2+}$:SrClF or $Eu^{2+}$:SrClF), $MgF_2$ doped with metallic ions (e.g., $Sm^{2+}$:$MgF_2$ or $Co^{2+}$:$MgF_2$), $SrF_2$ or $SrCl_2$ doped with metallic ions, and $LiIn_5O_8$, $BaTiO_3$, $CaTiO_3$ or $SrZrO_3$ doped with metallic ions.

By causing the plurality of various light absorption centers to coexist or to exist in the form of layers, the number of light absorption centers can be increased while the distance between the same ones of the plurality of various light absorption centers is maintained, so that the memory capacity can be enlarged. Thus, a plurality of light absorption bands are formed as shown in FIG. 1(a), but light absorption bands can also be superposed at least partly as shown in FIG. 1(b). With some properties of the light absorption centers, the density of the same ones of the plurality of various light absorption centers can be heightened by the intervention of the different light absorption centers in such a way that the interaction between the same ones of light absorption centers is prevented from becoming too intense in spite of the shortened distance between them or that the compatibility of the light absorption centers with a medium (binder) is improved.

In applying the present invention, an appropriate medium for dispersing the light absorption centers is employed, whereby better reproduced signals are obtained.

BRIEF DESCRIPTION OF THE DRAWINGS

FIGS. 1(a) and 1(b) are diagrams showing the principles of the present invention.

FIG. 2 is a diagram showing the structures of dye molecules in an embodiment of the present invention.

FIG. 3 is a diagram showing a light absorption spectrum in an embodiment of the present invention.

DETAILED DESCRIPTION OF THE PREFERRED EMBODIMENTS

Now, the present invention will be described in connection with specific embodiments.

Example 1

The molecules of three hydroxyanthraquinones having structures shown in FIG. 2 were dispersed in a mixed methanol-ethanol medium at equal concentrations, and the dispersion was put in a quartz cell and cooled down to 2 degrees K. Subsequently, when a weak dye-laser beam was scanningly projected, it was found that three inhomogeneous absorption bands as shown in FIG. 3 were formed (Measure (1)). The sample was formed with holes by irradiating it with intense dye-laser beams of various wavelengths. As a result, it has been revealed that a multiple recording double or higher in multiplicity or recording than in case of a single inhomogeneous absorption band is possible. Meanwhile, even when three $SiO_2$ layers each containing the corresponding one of the three of the aforementioned dye molecules and formed by the sol-gel process were stacked as measure (5), a similar result was obtained.

Example 2

The crystal of $Sm^{2+}$:BaClF, the crystal of $Sm^{2+}$:CaF$_2$ and the crystal of $Eu^{2+}$:SrClF were bonded, and the resulting sample was cooled down to 2 K. When a dye-laser beam was condensed and was projected on the crystals, three inhomogeneous absorption bands as shown in FIG. 3 were observed as in Example 1 (Measure (4)). It is also the same as in Example 1 that, when holes are formed in the respective absorption bands, the multiplicity double or more higher than in the case of the single absorption band is attained. In this case, however, it is more preferable that the distance between a lens and the recording medium is changed depending upon the crystals to be recorded, thereby making it possible to sufficiently condense the beam on the respective crystals.

In contrast, the position of the lens need not be changed in a case where BaClF and SrClF are successively and repeatedly grown on a CaF$_2$ crystal by hetero-epitaxial growth and where the resulting structure is implanted with $Sm^{2+}$ ions and then annealed.

Meanwhile, as Measure (2), the ions of both Sm and Eu are implanted into a CaF$_2$ crystal, to form a plurality of color centers, whereby the multiplicity of recording can be raised. However, the multiplicity is lower than in the crystal stacking measure stated above.

When one side of a CaF$_2$ crystal doped with Sm is held in contact with a quartz plate or is bonded thereto and the resulting structure is heated in chlorine gas, F is substituted by Cl in the whole crystal or in a part thereof opposite to the quartz plate, and a plurality of various color centers can be formed (Measure (3)).

An alkaline halide crystal favorable for performing the hole burning recording as stated above is made up of the combination between at least one element of Sr, Mg, Rb and Cs and at least one element of fluorine, chlorine, bromine and iodine. On the other hand, a favorable oxide crystal is made up of the combination among oxygen, at least one element of Na, K, Rb, Cs, Fr, Be, Mg, Ca and Ba, and at least one element of Sb, Bi, Si, Ge, Sn, Pb, Al, Ga, In, Tl, Zn, Cd, Cu, Ag, Au, Ni, Co, Fe, Mn, Cr, Mo, W, V, Nb, Ta, Ti, Zr, Hf, Sc, Y and U. Among the metallic elements of Sb etc., at least one element of In, Zr, Hf, V, Nb, Ta, Cr, Mo and W produces a better result. As ions with which the alkaline halide or oxide crystal is doped, at least one element of La, Ce, Pr, Nd, Eu, Cd, Tb, Sc, Ti, V, Mn, Fe, Ni and Cu is especially favorable. These crystals bring forth excellent properties, not only in the case where they are used in the stacked forms as in the examples, but also in a case where the hole burning is performed with the single crystal.

According to the present invention, it is possible to solve the problem of recording utilizing hole burning that, although the multiplicity of the recording is high, the spacial recording density is low, so the overall recording density does not become sufficiently high. This produces the effect that optical recording of very high recording density can be realized.

What is claimed is:

1. An optical recording method utilizing hole burning with light, comprising:

providing a recording medium having a recording layer containing therein at least first and second groups of light absorption centers, said first group of light absorption having a first inhomogeneous absorption band covering a different set of wavelengths than a set of wavelengths covered by a second inhomogeneous absorption band of said second group;

projecting light at a plurality of wavelengths within said set of wavelengths covered by said first inhomogeneous absorption band onto a spot on said recording layer thereby burning a plurality of narrow spectral holes at various wavelengths in the inhomogeneous absorption band of a light a light absorption center of said first group; and projecting light at a plurality of wavelengths within said set of wavelengths covered by said second inhomogeneous absorption band onto said spot on said recording layer thereby burning a plurality of narrow spectral holes at various wavelengths in the inhomogeneous absorption band of a light absorption center of said second group, whereby a high recording density can be realized.

2. An optical recording method as defined in claim 1, wherein said first inhomogeneous absorption band does not overlap with said second inhomogeneous absorption band.

3. An optical recording method as defined in claim 1, wherein said first inhomogeneous absorption band only partially overlaps with said second inhomogeneous absorption band.

4. An optical recording method utilizing hole burning with light comprising:

providing a recording medium comprising at least a first recording layer containing a first group of light absorption centers and a second recording layer containing a second group of light absorption centers, said first group of light absorption centers having a first inhomogeneous absorption band covering a different set of wavelengths than a set of wavelengths covered by said second inhomogeneous absorption band of said second group;

projecting light at a plurality of wavelengths within said set of wavelengths covered by said first inhomogeneous absorption band onto a spot on said first recording layer thereby burning a plurality of narrow spectral holes at various wavelengths in the inhomogeneous absorption band of a light absorption center of said first group; and projecting light at a plurality of wavelengths within said set of wavelengths covered by said second inhomogeneous absorption band onto a spot on said second recording layer thereby burning a plurality of narrow spectral holes at various wavelengths in the inhomogeneous absorption band of a light absorption center of said second group, whereby high recording density can be realized.

5. An optical recording method as defined in claim 4, wherein said light is projected onto said first and second recording layers through a lens and the distance between said lens and said recording medium is changed so as to project said light on said first or second recording layer.

6. An optical recording method as defined in claim 4, wherein said light is projected through a lens onto said spot on said first recording layer and onto said spot on said second recording layer without changing a position of said lens.

7. An optical recording medium having a recording layer containing therein at least first and second groups of light absorption centers, said first group of light absorption having a first inhomogeneous absorption band covering a different set of wavelengths than a set of wavelengths covered by a second inhomogeneous absorption band of said second group; wherein high density recording is accomplished by projecting light at a plurality of wavelengths within said set of wavelengths covered by said first inhomogeneous absorption band onto a spot on said recording layer thereby burning a plurality of narrow spectral holes at various wavelengths in the inhomogeneous absorption band of a light a light absorption center of said fist group; and projecting light at a plurality of wavelengths within said set of wavelengths covered by said second inhomogeneous absorption band onto said spot on said recording layer thereby burning a plurality of narrow spectral holes at various wavelengths in the inhomogeneous absorption band of a light absorption center of said second group.

8. An optical recording medium as defined in claim 7, wherein said first inhomogeneous absorption band does not overlap with said second inhomogeneous absorption band.

9. An optical recording medium as defined in claim 7, wherein said first inhomogeneous absorption band only partially overlaps with said second inhomogeneous absorption band.

10. An optical recording medium comprising at least a first recording layer containing a first group of light absorption centers and a second recording layer containing a second group of light absorption centers, said first group of light absorption centers having a first inhomogeneous absorption band covering a different set of wavelengths than a set of wavelengths covered by said second inhomogeneous absorption band of said second group; wherein high density recording is accomplished by projecting light at a plurality of wavelengths within said set of wavelengths covered by said first inhomogeneous absorption band onto a spot on said first recording layer thereby burning a plurality of narrow spectral holes at various wavelengths in the inhomogeneous absorption band of a light absorption center of said first group; and projecting light at a plurality of wavelengths within said set of wavelengths covered by said second inhomogeneous absorption band onto a spot on said second recording layer thereby burning a plurality of narrow spectral holes at various wavelengths in the inhomogeneous absorption band of a light absorption center of said second group.

* * * * *